No. 629,234. Patented July 18, 1899.
W. CAHILL.
HORSESHOE.
(Application filed Mar. 8, 1899.)
(No Model.)
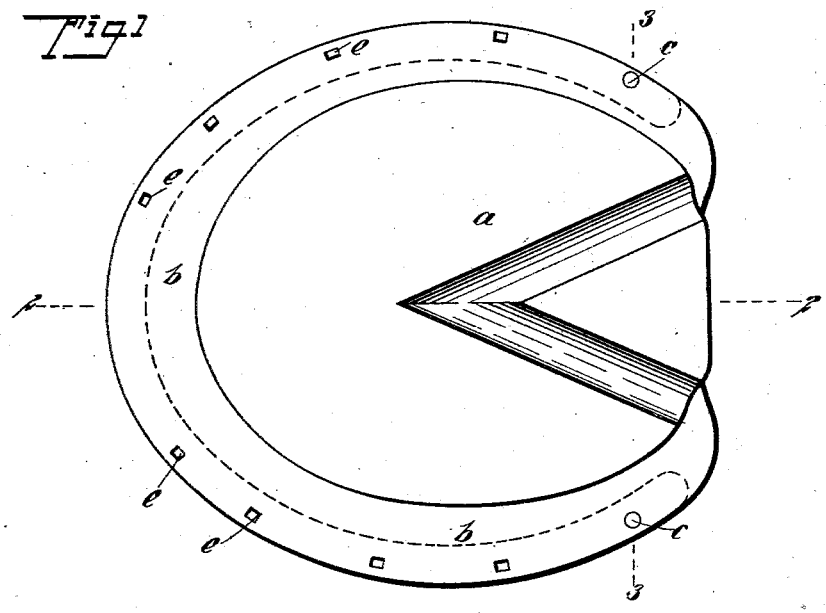
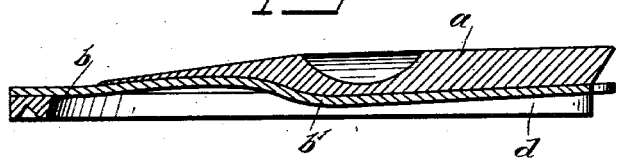
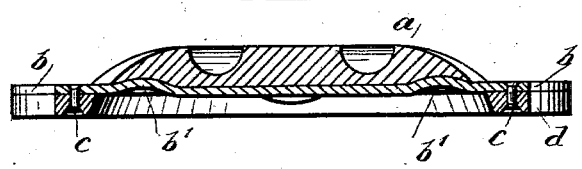
WITNESSES:
INVENTOR
William Cahill
BY
ATTORNEYS.

UNITED STATES PATENT OFFICE.

WILLIAM CAHILL, OF SAN FRANCISCO, CALIFORNIA.

HORSESHOE.

SPECIFICATION forming part of Letters Patent No. 629,234, dated July 18, 1899.

Application filed March 8, 1899. Serial No. 708,217. (No model.)

*To all whom it may concern:*

Be it known that I, WILLIAM CAHILL, of San Francisco, in the county of San Francisco and State of California, have invented a new and Improved Horseshoe, of which the following is a full, clear, and exact description.

The purpose of this invention is to provide a horseshoe adapted especially for use by racing-horses; and to such end the invention comprises a light-metal plate adapted to be attached to the horse's hoof to hold in place an elastic pad, which bears against the frog of the hoof. The plate has at its lower face a bar or shoe, which is constructed and arranged with relation to the plate in such a manner as to protect the hoof more effectively than the devices heretofore provided.

This specification is the disclosure of one form of the invention, while the claim defines the actual scope thereof.

Reference is to be had to the accompanying drawings, forming a part thereof, in which similar characters of reference indicate corresponding parts in all the views.

Figure 1 is a top plan view of the invention. Fig. 2 is a vertical longitudinal section on the line 2 2 of Fig. 1, and Fig. 3 is a vertical cross-section on the line 3 3 of Fig. 1.

The shoe has an elastic pad $a$, of felt, cotton, rubber, or like material, the upper surface of which is shaped to conform to the frog of the horse's hoof. This pad is held firmly against the hoof and in such a manner as to prevent the entry of dirt, snow, and other matter into the space between the pad and hoof by means of an aluminium or other light-metal plate $b$, which plate is shaped to conform to the hoof and bears against the bottom thereof to cover the hoof. The plate $b$ is formed with an approximately V-shaped indented portion $b'$, which serves to press the pad $a$ upward into place and to hold the pad firmly against the frog of the hoof, such indented portion $b'$ also conforming to the shape of the frog.

Attached to the plate $b$ is a bar or shoe proper, $d$, which has rivets $c$ at the respective heel portions thereof and which lies around the outer edge of the plate $b$ at the under face thereof. The bar $d$ and the plate $b$ are provided with holes $e$, registering with each other and adapted to receive the nails of the shoe, which are driven through the bar $d$ and plate $b$ and into the hoof, thus securing the toe portion of the shoe proper, $d$, firmly against the plate $b$ and in turn securing the plate firmly against the hoof. By this construction the plate $b$ is pressed firmly by the bar or shoe proper, $d$, and the usual cross-bar or frog, which extends between the heel portions of the bar or shoe proper, $d$, is avoided. The plate $b$, being constructed of aluminium, is very light and does not hinder the action of the horse. At the same time the arrangement of the shoe proper and the plate, with the pad, prevents the lodgment of dirt or snow between the shoe and hoof, which materially increases the speed of the horse in that it avoids the clogging of the frog of the hoof.

My invention will avoid the spreading of the hoof, which is a common occurrence among race-horses, and will also cure quarter-cracks, as it gives a solid bearing all over the hoof, which relieves the weight on the heels. Further, the invention protects hoofs having weak or bruised soles.

Having thus described my invention, I claim as new and desire to secure by Letters Patent—

A horseshoe, provided with a plate conforming to the shape of the hoof and extending around the edges thereof, the plate having an indented portion serving to press the pad against the frog of the hoof, and a bar or shoe proper extending around the front and side edges of the plate and having heel portions separated at the frog of the hoof, such heel portions being respectively riveted fast to the plate, the front portion of the bar and plate being provided with registering openings adapted to receive nails for securing the plate and bar to the hoof.

WILLIAM CAHILL.

Witnesses:
 JAMES CONWAY,
 ANDREW JACKSON HENRY.